United States Patent [19]

Kozachevsky et al.

[11] Patent Number: 4,846,771
[45] Date of Patent: Jul. 11, 1989

[54] COGGED BELT WITH REINFORCING ELEMENT IN THE FORM OF CORRUGATED BAND

[76] Inventors: Gennady G. Kozachevsky, ulitsa Yakubovskogo, I8, korpus 2, kv.27I., Minsk; Valery V. Guskov, ulitsa Kulman, I3, kv.I9., Minsk; Vladimir P. Boikov, ulitsa Ya.Kolasa, I39, kv.I72., Minsk; Oleg I. Molodan, ulitsa Slavinskogo, I5, kv.63., Minsk; Svetlana I. Sizova, ulitsa Ya.Kolasa, I39, kv.I72., Minsk; Jury N. Gorodnichev, ulitsa Gertsena, 37, korpus I, kv.72., Moscow; Tamara P. Nazarenko, ulitsa Kazintsa, 97, korpus 2, kv.I9., Minsk, all of U.S.S.R.

[21] Appl. No.: 41,146
[22] PCT Filed: Jun. 28, 1985
[86] PCT No.: PCT/SU85/00058
  § 371 Date: Feb. 25, 1987
  § 102(e) Date: Feb. 25, 1987
[87] PCT Pub. No.: WO87/00253
  PCT Pub. Date: Jan. 15, 1987
[51] Int. Cl.$^4$ .................................... F16G 1/08
[52] U.S. Cl. .................... 474/268; 474/153; 474/205
[58] Field of Search ............... 474/268, 272, 201, 205, 474/153

[56] References Cited

U.S. PATENT DOCUMENTS

| | | | |
|---|---|---|---|
| 2,551,578 | 5/1951 | Bendall | 474/153 |
| 3,772,929 | 11/1973 | Redmond Jr. | 474/205 |
| 4,504,256 | 3/1985 | Matsumura et al. | 474/250 |

FOREIGN PATENT DOCUMENTS

| | | | |
|---|---|---|---|
| 533398 | 8/1931 | Fed. Rep. of Germany | 474/205 |
| 48-24573 | 7/1973 | Japan . | |
| 1073511 | 2/1987 | U.S.S.R. . | |
| 962956 | 7/1964 | United Kingdom | 474/205 |

Primary Examiner—Thuy M. Bui
Attorney, Agent, or Firm—Lilling & Greenspan

[57] ABSTRACT

A cogged belt (1) having an elastic base of which accommodates a carrying element (4) and an element (6) reinforcing cogs (5) of the belt (1). The reinforcing element (6) has the form of a corrugated band corrugations (7) of which are arranged inside the cogs (5) of the belt (1). The carrying element (4) is continuous through the length of the belt (1), whereas the reinforcing element (6) and its corrugations (7) have a width substantially the same as that of the carrying element (4) equal to the length of the cog (5) of the belt. The reinforcing element (6) is arranged at one side of the carrying element (4).

13 Claims, 4 Drawing Sheets

COGGED BELT WITH REINFORCING ELEMENT IN THE FORM OF CORRUGATED BAND

BACKGROUND OF THE INVENTION

1. Field of the Invention

This invention relates generally to mechanical drive belts, and more particularly to cogged belts used in power transmissions.

2. Description of the Prior Art

There is known a cogged belt an elastic base of which accommodates a carrying element in the form of spirally wound cords. In order to ensure increased rigidity of the cogs, their interior is provided with inserts of a harder material extending longitudinally of the belt cog (cf., e.g., U.S. Pat. No. 3,772,929). The carrying element and inserts are bonded therebetween only by the elastomeric base to result in the lack of rigid connection and consequently in a tendency to fatigue failure in the form of cracks at the cog root during operation of the cogged belt.

There is also known a cogged belt an elastic base of which accommodates a carrying element and an element reinforcing the belt cogs in the form of a corrugated band with the corrugations embedded within the cog interior. The carrying element has ports at the cog location for these ports to receive corrugations of the reinforcing band having a width corresponding to the width of the ports. Inserts are interposed between the corrugations of the reinforcing element and carrying element inside the belt cogs (cf., USSR Inventor's Certificate No. 1,073,511, published Feb. 15, 1984).

However, because the carrying element in the form of a band has ports receiving corrugations of the reinforcing band the integrity of the carrying element is impaired, whereas the reinforcing element has a width equal to that of the ports, whereby the carrying capacity of the belt is affected, since the force transmitted by the belt is taken up by the reinforcing element at sections thereof having corrugations, and by the carrying element at portions between the corrugations, which reduces the carrying capacity of the belt.

SUMMARY OF THE INVENTION

The invention aims at the provision of a cogged belt in which carrying and reinforcing elements would be so constructed as to substantially increase the carrying capacity of the cogged belt.

The aims of the invention are attained by a cogged belt an elastic base of which accommodates a carrying element and element reinforcing cogs. The belt is in the form of a corrugated band with corrugations thereof embedded in the cogs of the belt. According to the invention, the carrying element is continous throughout the length of the belt, whereas the reinforcing element and corrugations thereof have a width equal to the width of the carrying element substantially equal to the length of the belt cog. The reinforcing element is arranged at one side of the carrying element.

Making use of the carrying and reinforcing elements integral throughout the length of belt cog enables an increase in the rigidity of the belt cogs and enhances the carrying capacity of the belt.

Preferably, a portion of the reinforcing element which forms the corrugation has a thickness greater than a portion interposed between the corrugations.

The arrangement of the reinforcing element through reducing the thickness of the portions between the corrugations makes it possible to provide a cogged belt having a high lateral flexibility, whereas increasing the thickness of the corrugated portions provides cogs of higher rigidity to result in enhanced carrying capacity of the cogged belt.

Alternatively, each cog of the belt is hollow through the length of a space confined between the corrugation and carrying element.

Such an arrangement of the cog makes it possible to reduce the weight of the belt as a result of using less elastomeric material, and also to render the cogged belt less susceptible to heating while retaining its carrying capacity.

Preferably, the walls of the cogs have through holes extending longitudinally of the carrying layer.

Advisably, through holes are also provided at the portions of the cogged belt between its cogs.

The provision of said holes reduces noise arising during operation of the cogged belt transmission, because the compressed air can escape freely as the cogs are engaged.

Favourably, the ends of the carrying element overlap and have in the zone of the cog mutually registered slots forming petals crimped jointly toward the interior of the cog.

Alternatively, a plate is placed between the petals, the petals being crimped onto this plate.

This connection of the carrying element ensures high carrying capacity of the cogged belt in the zone where these ends are connected.

Advantageously, the carrying element of the proposed belt has portions projecting away from the cogs at both sides thereof through the length of the belt.

The provision of such projecting portions at the carrying element of the cogged belt and cooperating flanges of the pulley enables a reduction of the bending loads exerted on the reinforcing layer, which in turn adds to the carrying capacity of the belt.

In view of the aforedescribed, the cogged belt embodying the present invention, while being structurally simple, offers a higher carrying capacity. Another advantage is that the proposed cogged belt is not susceptible to fatigue cracking at the cog root, and the cog side has a less pronounced tendency to wear than in the prior art belts.

BRIEF DESCRIPTION OF THE DRAWINGS

The invention will now be described in greater detail with reference to specific embodiments thereof taken in conjunction with the accompanying drawings, in which.

DESCRIPTION OF THE PREFERRED EMBODIMENTS

Figure 1:
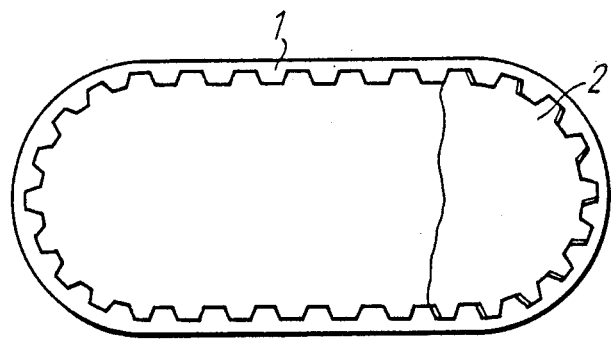
FIG. 1 is a general schematic view of a cogged belt transmission according to the invention.
Figure 2:
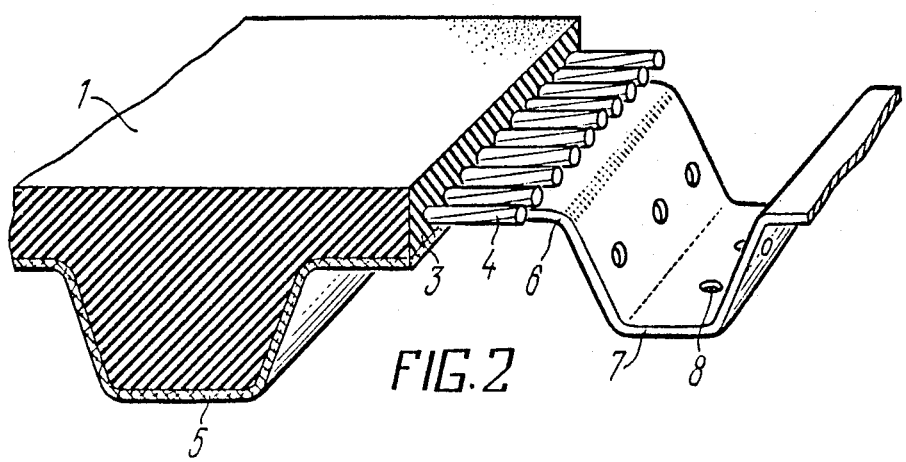
FIG. 2 shows an axonometric view of a portion of the proposed cogged belt in which the carrying element is made up of cords.

A cogged belt transmission comprises a cogged belt 1 (FIG. 1) hereinafter referred to as belt 1, and pulleys 2 engageable therewith. The cogged belt 1 includes an elastic base 3 (FIG. 2) in which there is embedded a carrying element 4, and element 6 reinforcing cogs 5. The carrying element 4 is formed by a spirally twisted cord extending through the length and width of the belt 1 and extend over a width substantially equal to the width of the elastic base (3). As shown, the cords are arranged in a common plane substantially parallel to the cogged belt (1) and are substantially uniformely spaced from each other. The reinforcing element 6 is fashioned as a corrugated belt indicated by the same reference numeral 6 and having a width substantially equal to the width of the carrying element 4. The reinforcing element 6 is arranged at one side of the carrying element 4, and its corrugations 7 embrace the cogs 5 of the belt 1. The arrangement of the reinforcing element at one side of the carrying element 4 provides integrity of these elements through the width of the belt 1, to result in increased rigidity of the cogs 5 and improved carrying capacity of the belt 1. Through holes 8 are provided in the reinforcing element 6 to ensure a better bond between the parts of the elastic base 3 at the opposite sides of this reinforcing element 6.

Figure 3:
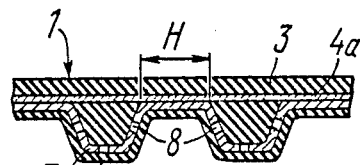
FIG. 3 is a longitudinal section of a portion of the cogged belt according to the invention where the carrying layer has the form of a band.

Alternatively, a belt 4a (FIG. 3) can be used as the carrying element, preferably fabricated from metal or polymeric materials.

Figure 4:
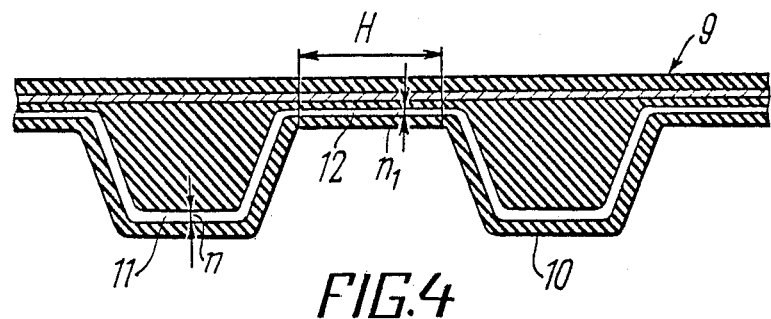
FIG. 4 is a longitudinal sectional view a portion of the proposed cogged belt in which portions of the carrying element have different thickness.

In order to ensure a relatively high lateral flexibility of the belt 9 (FIG. 4) and greater rigidity of the cogs 10, the section of the reinforcing element defining cogs 11 (FIG. 4) has a thickness "h" substantially greater than the thickness "$h_1$" of a section 12 through the length "H" of the reinforcing element in the space between the corrugations 11.

Figure 5:
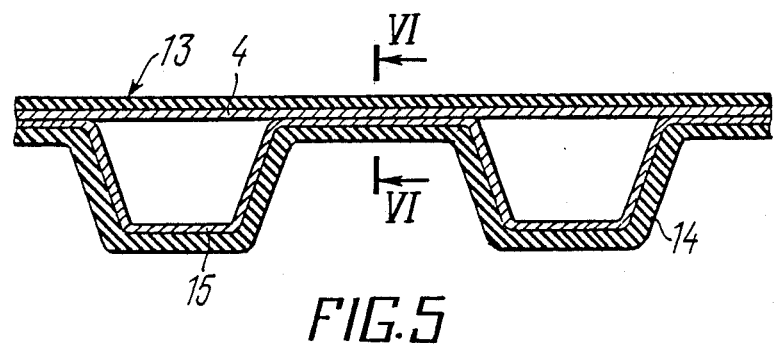
FIG. 5 is a longitudinal sectional view of a portion of the proposed cogged belt in which the cogs are hollow.

To ensure that a smaller amount of an elastomeric material is consumed, as well as to reduce the weight of the belt 13 (FIG. 5) and its tendency to heat, cogs 14 of the belt 13 are hollow through the length thereof in the space between the corrugation 15 and carrying element 4.

Figure 6:
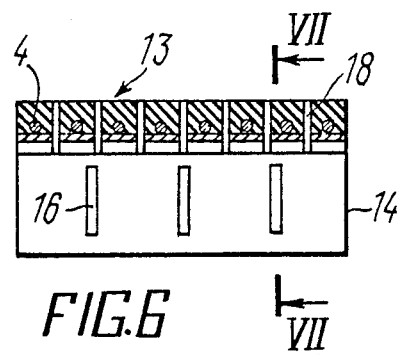
FIG. 6 is a section taken along the line VI—VI in FIG. 5.
Figure 7:
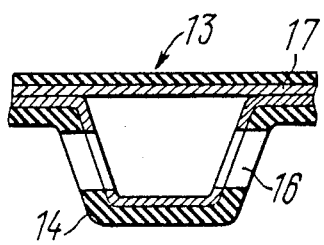
FIG. 7 is a section taken along the line VII—VII in FIG. 6.

For reducing the amount of noise produced during operation of the cogged belt transmission the cogs 14 of the belt 13 have through holes 16 (FIGS. 6 and 7) lengthwise of a carrying layer 17. Portions of the reinforcing element disposed between the cogs 14 (FIG. 5) have through holes 18 (FIG. 6). The provision of the holes 16 and 18 ensures free escape of air compressed as the cogs 14 are brought in engagement.

Figure 8:
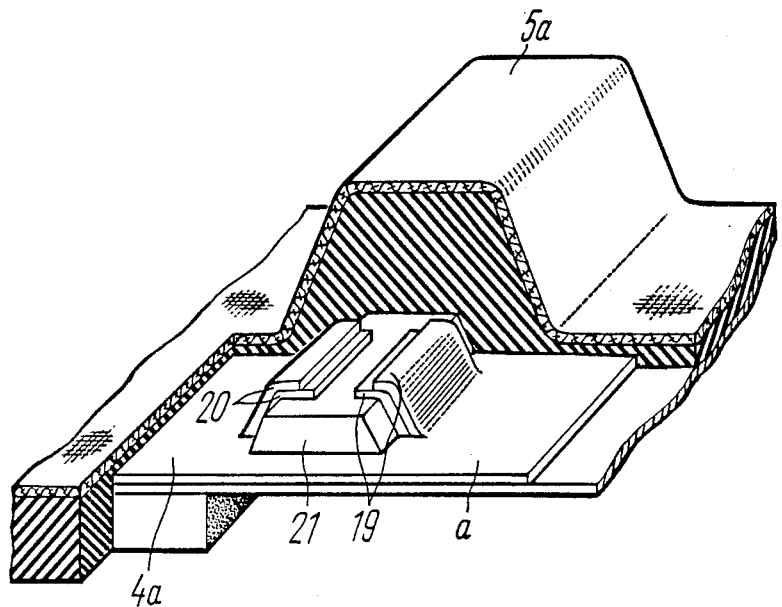
FIG. 8 illustrates connection of the ends of the cogged belt.

With reference to FIG. 8, to ensure a more reliable connection of ends "a" of the carrying element 4a having the form of a band, they overlap.

In the zone of the cog 5a such ends have slots forming lobes 19 and 20 crimped together to the inside of the cog 5a. A plate member 21 is secured between the lobes 19 and 20 on the carrying element 4a, the edges of these lobes 19 and 20 being crimped onto this plate member 21. The connection of the ends "a" of the carrying element 4a in the zone of the cog 5a is virtually not subject to flexural stress arising as the belt bends round the pulley, which ensures high carrying capacity of the belt.

Figure 9:
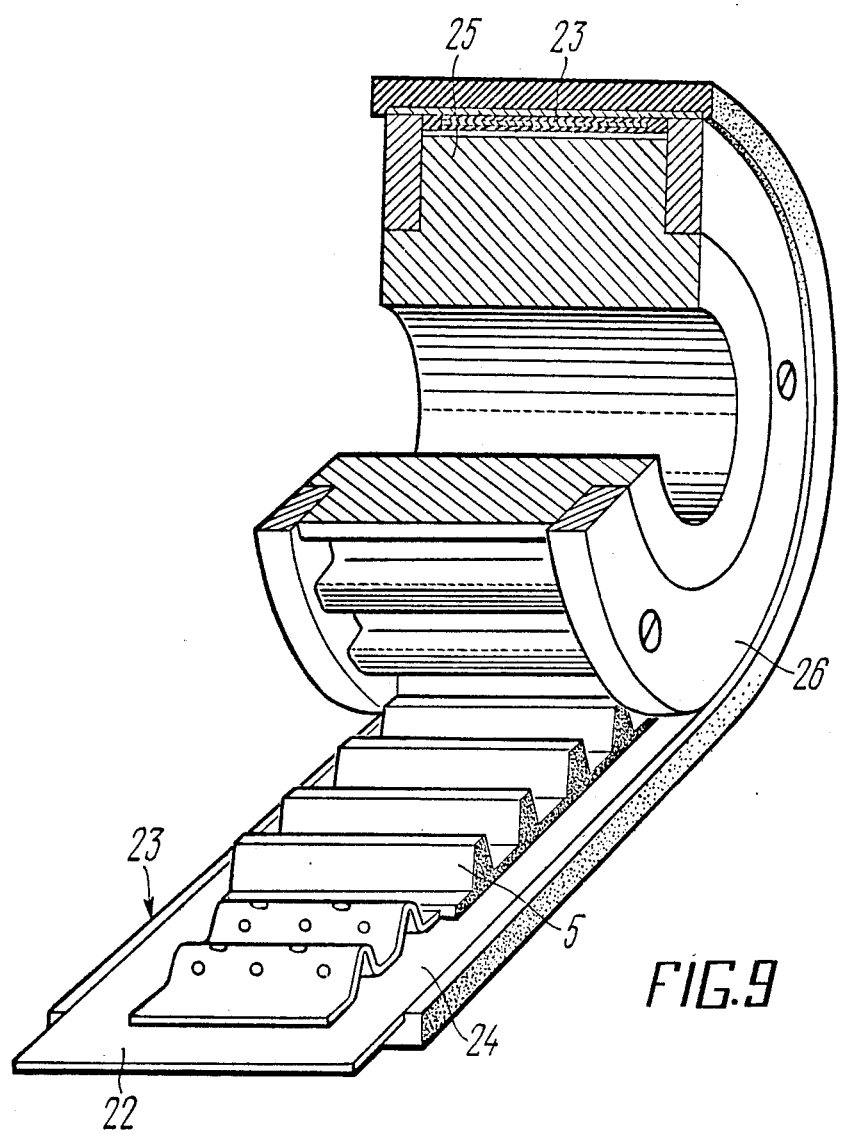
FIG. 9 is an axonometric view of a portion of the proposed cogged belt transmission.

Referring now to FIG. 9, a carrying element 22 of belt 23 has portions 24 extending to an equal distance from the cog 5 of the belt 23 at both sides through the length thereof, whereas pulleys 25 have flanges 26 at both sides thereof to cooperate with the projecting portions 24 of the belt 23. The provision of the projecting portions 24 of the belt 23 cooperating with the flanges 26 of the pulley 25 reduces bending loads exertable on the carrying element 22, and ensures smooth bending of the carrying element 22 about the radius owing to that the portions 24 of the belt 23 disposed in the course of engagement above the valleys of the pulley 25 are caused to bend very much like the portions above the peaks about the arc of a circle.

The outside diameter of the flanges 26 is somewhat greater than the outside diameter of the teeth of the pulley 25, which ensures more favorable conditions for engagement of the pulley teeth due to reduced cog interference.

The cogged belt transmission according to the invention cooperates in the following manner.

In the course of operation the cogs 5 of the belt 1 are brought in engagement with the teeth of the pulley to result in transmission of power. At the portions of the belt 1 between the teeth 5 the power transmission is taken up mostly by the carrying element 4. The cogs 5 of the belt 1 in engagement with the teeth of the pulley 2 take up a tangential force, which tends to cause fatigue cracks at the root of the belt cogs 5.

By virtue of embedding inside the cogs 5 of the belt 1 of the reinforcing element 6, shear stresses taking place in belt cogs of prior art construction are substituted by compressive stresses to result in the absence of such degradation factor as fatigue cracks at the root of the belt cog 5.

Increasing the belt cog ridigity through embedding a reinforcing element ensures slow wear of the cogs due to reduced interference of the cogs 5 as they are brought in engagement.

The provision of portions of the corrugated band 6 of varying thickness ensures a longer service life of the belt due to the optimum rigidity of the cogs and lateral rigidity of the belt.

Polarization and optical research has shown that during operation of the cogged belt transmission the elastic material accommodated in the space between the corrugation 7 and carrying element 4 virtually carries no load, and for this reason it is advisable to provide a through hole therein.

The provision of through holes in the belt cogs and in the space between the cogs results in reduced wear of the belt cogs.

The cogged belt transmission embodying the features of the present invention provides reduced flexural stresses in the belt 23 due to the cooperation of the portions 24 of the carrying element 22 with the flanges 26 of the pulley 25

This in turn enables an incease in the pull force of the belt without affecting its service life. Tests of the m=7 mm module cogged belts of the prior art construction at a circumferential force of P=320 n/cm and cogged belts of the same module at a circumferential force of P=460 n/cm evidenced that both belts had equal service life.

The tests have been carried out on a double-pulley stand. One pulley drove the cogged belt of the prior art construction, whereas the other was used with the cogged belt embodying the present invention to provide equal operating conditions. To obviate the influence of other production factors, the belts of both constructions have been manufactured by one rolled-up device using the same carrying elements, elastic base, and wear-resistance lining.

The proposed cogged belt with novel structural features has a higher cog rigidity when utilizing the same conventional elastomeric materials, which substantially reduces the tendency of cogs to interfere and obviates fatigue failure in the form of cracks at the cog root.

The invention is most preferable for use in power cogged belt transmissions.

We claim:

1. A cogged belt (1) having an elastic base (3) which accomodates a carrying element (4) and an element (6), for reinforcing cogs (5) of the belt (1), in the form of a corrugated band with corrugations (7) thereof embedded in the cogs (5) of the belt (1), wherein the carrying element (4) is continuous through the length of the belt (1) and extends over a width substantially equal to the width of the elastic base (3), whereas the reinforcing element (6) and corrugations (7) thereof have a width substantially equal to the width of the carrying element (4) and substantially equal to the length of the cog (5) of the belt (1), the reinforcing element (6) being arranged on only one side of the carrying element (4).

2. A cogged belt as claimed in claim 1, characterized in that a portion (11) of the reinforcing element defining the corrugation has a thickness (h) greater than that of a portion (12) disposed between the corrugations.

3. A cogged belt as claimed in claim 1, characterized in that each cog (14) of the belt (13) is hollow through the length of a space confined between the corrugation (15) and carrying element (4).

4. A cogged belt as claimed in claim 3, characterized in that the walls of the cogs (14) of the belt (13) have through holes (16) extending longitudinally relative to the carrying layer (4).

5. A cogged belt as claimed in claim 1, characterized in that through holes (18) are provided at the portions of the cogged belt (13) between its cogs (14).

6. A cogged belt as claimed in claim 1, characterized in that ends (a) of the carrying element (4a) overlap and have in the zone of the cog (5a) mutually registered slots forming petals (19 and 20) crimped jointly toward the interior of the cog (5a).

7. A cogged belt as claimed in claim 6, characterized in that a plate (21) is placed between the petals (19 and 20), whereas these petals (19 and 20) are crimped onto this plate (21).

8. A cogged belt as claimed in claim 1, characterized in that the carrying element (22) of the cogged belt (23) has portions (24) equally projecting from the cogs (5) at both sides thereof through the length of the belt (23).

9. A cogged belt as defined in claim 1, wherein through holes (8) are provided in the reinforcing element portions of the elastic band (3) on opposite sides of the reinforcing element (6).

10. A cogged belt as defined in claim 1, wherein said carrying element (4) comprises a plurality of cords spaced from each other across the width of the said carrying element.

11. A cogged belt as defined in claim 10, wherein said cords are spirally twisted.

12. A cogged belt as defined in claim 10, wherein said cords are arranged in a common plane substantially parallel to the cogged belt.

13. A cogged belt as defined in claim 10, wherein said cords are substantially uniformly spaced from each other.

* * * * *